United States Patent [19]

Nemesi et al.

[11] Patent Number: 4,789,387

[45] Date of Patent: * Dec. 6, 1988

[54] DUST COLLECTOR

[75] Inventors: Stephen A. Nemesi, Lebanon, Ind.; William J. Klimczak, Racine, Wis.

[73] Assignee: Venturedyne, Ltd., Milwaukee, Wis.

[*] Notice: The portion of the term of this patent subsequent to Mar. 25, 2003 has been disclaimed.

[21] Appl. No.: 550,940

[22] Filed: Nov. 14, 1983

Related U.S. Application Data

[63] Continuation-in-part of Ser. No. 281,962, Jul. 10, 1981, abandoned, which is a continuation of Ser. No. 140,697, Apr. 16, 1980, abandoned.

[51] Int. Cl.$^4$ ............................................. B01D 46/02
[52] U.S. Cl. ............................................. 55/96; 55/302
[58] Field of Search ..................... 55/96, 302, 378, 379

[56] References Cited

U.S. PATENT DOCUMENTS

| | | | |
|---|---|---|---|
| 4,073,632 | 2/1978 | Reinauer et al. | 55/379 |
| 4,077,781 | 3/1978 | Sundstrom | 55/96 |
| 4,209,310 | 6/1980 | Berkhoel | 55/302 |
| 4,278,454 | 7/1981 | Nemisi | 55/302 |

FOREIGN PATENT DOCUMENTS 2738502 3/1979 Fed. Rep. of Germany ........ 55/302

OTHER PUBLICATIONS

Mikro-Pulsaire Dust Collector-Pulverizing Machinery, Chatham Road, Summit, New Jersey, 11/27/67, pp. 1-11.

*Primary Examiner*—Bernard Nozick
*Attorney, Agent, or Firm*—Michael, Best & Friedrich

[57] ABSTRACT

The invention provides a filter apparatus for use in air pollution control which includes at least one hollow filter assembly disposed in a hopper and having an open upper end registering with a wall opening. Contaminated air is introduced into the hopper through an inlet and is caused to flow into an exhaust chamber through the filter and the opening. The filter apparatus includes an end plate supporting the filter assembly and sealing the lower end of the filter assembly. The filter apparatus also includes a nozzle spaced above the filter assembly for selectively directing a reverse pulse of air into the open upper end of the filter such that the reverse air pulse enters the filter assembly and flows through the filter medium in the reverse of the direction of contaminated airflow to thereby remove accumulated contaminants from the filter medium. The nozzle is constructed such that the air pulses emitted from the nozzle propagate toward the wall opening in a cone-shaped pattern with the base of the cone engaging the wall at the wall opening and surrounding the open end of the filter, and such that the air pulses propagate downwardly into the filter assembly and impinge directly upon the end plate and do not impinge upon the filter medium.

5 Claims, 1 Drawing Sheet

U.S. Patent
Dec. 6, 1988
4,789,387
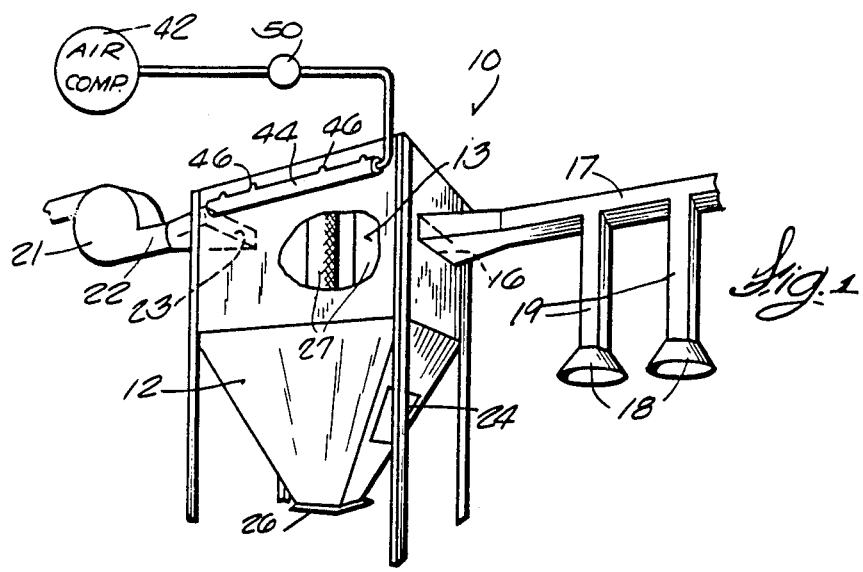
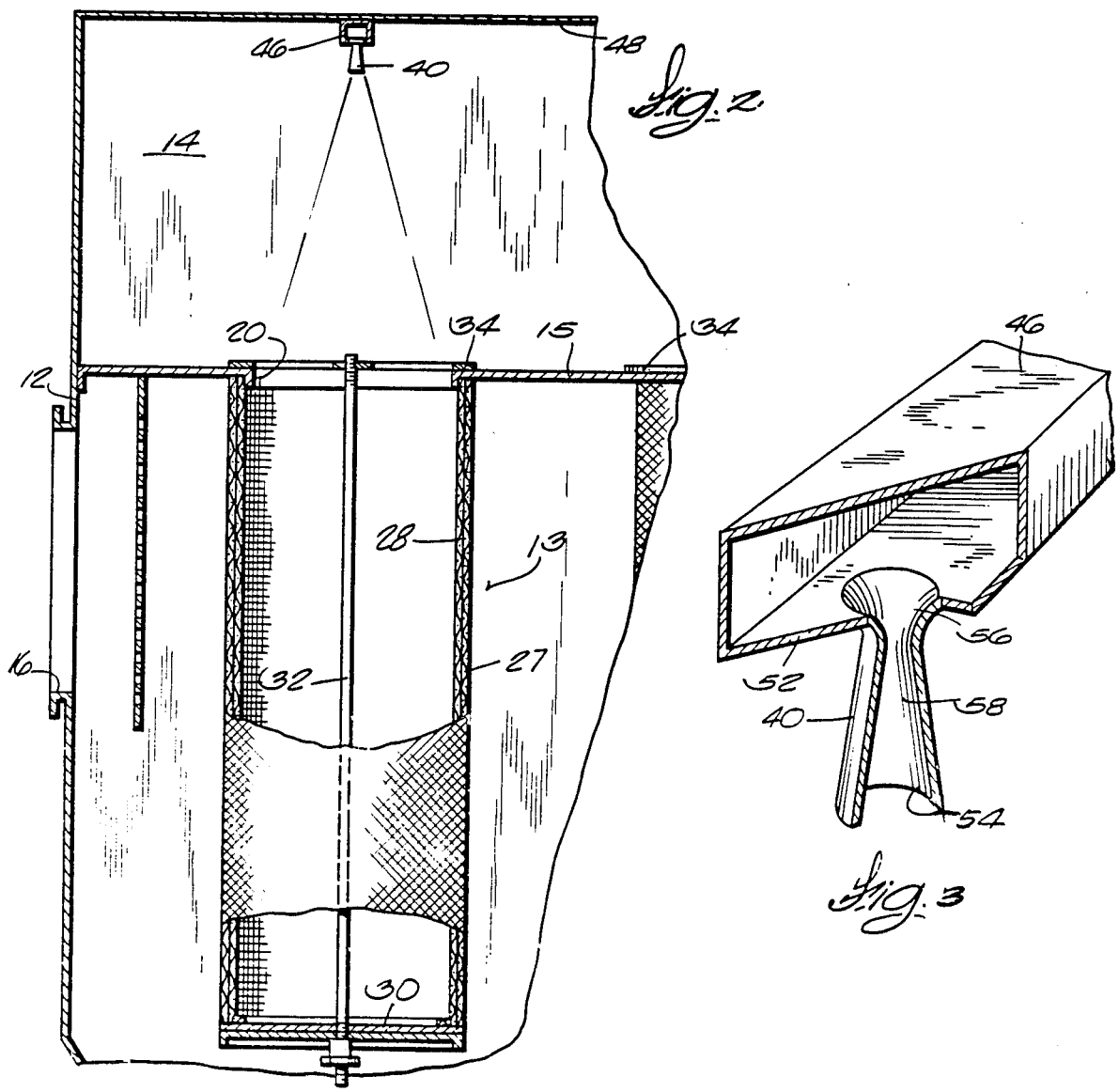

DUST COLLECTOR

RELATED APPLICATION

This is a continuation-in-part of application Ser. No. 281,962, filed on July 10, 1981, which was a continuation of application Ser. No. 140,697, filed Apr. 16, 1980 by Stephen A. Nemesi both abandoned.

FIELD OF THE INVENTION

This invention relates to air pollution control equipment such as fabric filter dust collectors and more particularly to such apparatus as utilize a reverse stream of compressed air to periodically clean the filter medium in dust collector systems.

BACKGROUND PRIOR ART

In a particular class of air filter apparatus commonly referred to as dust collector systems, it is known to utilize a reverse pulse of compressed air to clean contaminants which have accumulated on the surface of the filter medium. The fabric in a fabric filter dust collector serves essentially as a seive. It acts to retain the dust on one side from passing through to the other side. As a layer of dust builds on the surface of the fabric and as this process continues, increased amounts of energy are required to force the air through the fabric filter. Accordingly, it is desirable to periodically remove the build-up of cake material which collects on the outer surface of the fabric filter.

Various arrangements have been proposed to achieve that cleaning. An example of one such prior art fabric filter dust collector is described in the Pausch U.S. Pat. No. 3,436,899. That patent describes a prior art mechanism employed in an attempt to use supersonic air pulses to clean the fabirc filter tubes of the dust collectors.

Attention is also directed to the Pausch U.S. Pat. No. 4,026,682; the Duyckinck U.S. Pat. No. 3,942,962; the Pausch U.S. Pat. No. 3,798,878; and the Pausch U.S. Pat. No. 3,765,152. Attention is further directed to the Pausch U.S. Pat. No. 3,535,867; the Miller U.S. Pat. No. 4,042,356; the Lelaiert et al. U.S. Pat. No. 3,606,736 and the Lelaiert U.S. Pat. No. 3,853,509.

Attention is further directed to the Colley et al. U.S. Pat. No. 3,726,066; the Blackmore U.S. Pat. No. 3,626,674; the Pausch U.S. Pat. No. 3,499,268; the Samolia U.S. Pat. No. 4,097,255; and the Nemesi U.S. Pat. No. 4,278,454.

SUMMARY OF THE INVENTION

The present invention provides an improved arrangement for discharging a dust cake from the external surface of the filter medium or fabric bags of a dust collector. More particularly, the present invention provides a means for cleaning the entire length of the elongated filter of the dust collector while employing a minimum amount of energy. By improving the cleaning of the filters, the filters existing in the dust collector are more efficient in filtering the air, and accordingly, the dust collector can employ fewer filters and have a smaller size than prior art dust collectors having the same capacity. Additionally, the means for facilitating cleaning of the dust cakes from the filters is energy efficient in that it employs a minimum amount of compressed air to effect cleaning of the filters, thereby permitting the employment of a smaller air pump or air compresser and the employment of less energy in the operation of that air compresser.

More particularly, the invention includes a dust collector apparatus comprising, in combination, a hopper, an exhaust chamber, a wall separating the hopper and the exhaust chamber, the wall including an opening, at least one hollow filter assembly comprising filter medium and having upper and lower ends, the upper end of the filter assembly registering with the wall opening, and the hopper being generally sealed from the exhaust chamber except through the wall opening and the filter medium of the filter assembly. Means are provided for supporting the filter assembly and for sealing the lower end of the filter assembly, the means comprising an end plate generally parallel to the wall and abutting the lower end of the filter assembly. The filter apparatus also includes means defining an inlet into the hopper for introducing contaminated air into the hopper so that the contaminated air is caused to flow to the exhuast chamber through the filter medium, and airborne contaminants are accumulated on the filter medium. Means are also provided for selectively directing a reverse pulse of air into the opening of the filter assembly from the exhaust chamber side thereof so that air enters the filter assembly and generates an increased air pressure in the filter assembly and air flow through the filter medium in the reverse of the direction of contaminated airflow to thereby remove accumulated contaminants from the filter medium. The air pulse directing means includes nozzle means spaced above the wall opening and constructed to accelerate the air emitted toward the wall opening such that the air pulses are emitted from the nozzle means and propagate toward the wall opening in a cone-shaped pattern with the base of the cone engaging the wall at the wall opening and surrounding the wall opening, and such that the air pulses propagate downwardly into the filter assembly and impinge directly upon the end plate and do not impinge upon the filter medium.

Various other features and advantages of the invention are set forth in the following description and claims and in the drawings.

BRIEF DESCRIPTION OF THE DRAWINGS

FIG. 1 is a partial schematic view of a dust collector embodying the invention.

FIG. 2 is an enlarged cross section elevation view of a portion of the dust collector shown in FIG. 1.

FIG. 3 is an enlarged perspective view of the supersonic discharge nozzle in FIG. 2 and shown with portions broken away.

Before describing a preferred embodiment of the invention in detail, it is to be understood that the invention is not limited in its application to the details of construction and to the arrangement of the components set forth in the following description or illustrated in the drawings. The invention is capable of other embodiments and of being practiced and carried out in various ways. Also, it is to be understood that the phraseology and terminology employed herein is for the purpose of description and should not be regarded as limiting.

DESCRIPTION OF THE PREFERRED EMBODIMENT

A common type of filter apparatus to which this invention is particularly well suited is referred to as a dust collector or dust collector system. The invention will be discussed as embodied in such a system but it should be appreciated that the invention may have wider application than the one in which it will be discussed.

With reference to the drawings, filter apparatus 10 is central to the overall dust collection system. It includes a dust collecting hopper 12 in which a series of elongated cylindrical filter assemblies 13 are suspended, in the manner to be described hereinafter. The apparatus also includes an exhaust or clean air chamber 14 (FIG. 2) above the hopper 12 and suspended filter assemblies 13. The hopper 12 and the exhaust chamber 14 are separated by a horizontal header plate 15. A plurality of openings 20 in the header plate 15 are arranged in a row and a plurality of such rows are arranged on the header plate 15. In this embodiment, the openings 20 are generally circular. A filter assembly 13 suspended in the hopper 12 registers with each opening 20. This arrangement is conventional and has not been illustrated in its entirety.

Contaminated air is introduced into the hopper 12 by means of side inlet 16 and duct work 17. The contaminated air can come from any source, for example, fume collector hoods 18 at a welding station or the like. Two such collector hoods are illustrated schematically in FIG. 1. Collector hoods 18 are located adjacent the welding area and conduits 19 connect those hoods to the duct work 17.

A conventional fan 21 is connected by duct work 22 to an outlet opening 23 in exhaust chamber 14. Fan 21 draws air from the exhaust chamber 14, thereby creating a pressure drop between exhaust chamber 14 and hopper 12 and causing a flow of contaminated air into the hopper 12 and through the filter assemblies 13 and openings 20 into the exhaust chamber 14.

An access door 24 is provided in hopper 12 for maintenance, such as replacement of the filter assemblies 13, and a discharge door 26 is provided at the bottom of the hopper 12 to permit the hopper 12 to be periodically emptied of dust and other contaminants which have collected in the hopper 12.

Turning now to FIGS. 2 and 3, each filter assembly 13 (and only one will be described as the description applies to all) includes filter medium 27 made of a conventional material which is pervious to the air but not to airborne contaminants. The medium 27 is preferably cylindrical as illustrated. The filter medium 27 commonly comprises a fabric material and is supported by a cylindrical metal screen or mesh 28 which provides mechanical support for the medium but has a generally open construction so as not to interfere with airflow. Means are also provided for suspending the filter assemblies 13 from the header plate 15 which separates the exhaust or clean air chamber 14 from the lower or inlet chamber of the hopper 12. While various suspending means can be provided, in the construction illustrated the filter medium 27 and the metal screen 28 are supported by end plates 30, the plates 30 in turn supported by a tie rod 32 suspended from a supporting ring 34 surrounding the opening 20 and bearing against the upper surface of the header plate 15. The plates 30 supporting the filter assembly 13 also function to seal the lower end of the filter assembly 13.

As stated above, the filter medium 27 is impervious to airborne contaminants which, when their flow is interrupted by the filter medium 27, either adhere to the outer surface of the filter medium 27 or fall into the hopper 12. It is well knwon that the efficiency of the filter medium 27 improves as airborne contaminants are collected as a cake on the outer surface. However, it is also recognized that the thickness of that cake should be kept at an approximate minimum thickness and that excessive build-up should be avoided. Excessive build-up can substantially increase the pressure drop across the filter medium 27, thereby increasing the energy requirements for operation of the filter apparatus 10. In fact, build-up of excessive material on the filter medium 27 can reach the point where airflow through the filter apparatus 10 is virtually impossible. Accordingly, periodic cleaning of the filter assembly 13 to remove at least a portion of the accumulated cake of filtered material has been recognized as desirable and various arrangements have been proposed to achieve that cleaning.

The present invention includes an improved means for periodically cleaning the accumulated cake material from the external surface of the filter assemblies 13. Such means includes a means for selectively directing reverse pulses of compressed air into the filter assemblies 13. The air pulses are reverse in the sense that they are in the direction opposite to the flow of air through the apparatus during a regular filtering cycle. The pulse is of a short duration and it interrupts the filtering operation of the filter assemblies 13 for only a short period of time. The pulse of air is intended to dislodge the cake material from the external surface of the filter medium 27 of the filter assemblies 13 such that it can fall into the bottom of the hopper 12 where it can be removed.

Referring more particularly to the construction of the means for directing a reverse pulse of air into the filter assemblies 13, in the illustrated construction, that means includes a plurality of supersonic nozzles 40 positioned above the filter assemblies 13 and adapted to direct air pulses downwardly at a supersonic velocity in the direction of the openings 20 into the filter assemblies 13. The means selectively directing pulses of air into the filter assemblies 13 also includes an air pressure source such as an air compressor 42 supplying air under pressure to a manifold 44, the manifold 44 being connected to air conduits 46 housed in the exhaust chamber 14 and supported by its upper wall 48. Valve means 50 are also provided for selectively providing pulses of compressed air from the air pressure source 42 to the manifold 44 and the conduits 46. The air conduits 46 each include a bottom wall 52 supporting the downwardly extending supersonic nozzles 40. The nozzles 40 are positioned such that one nozzle 40 is positioned over each of the filter assemblies 13.

It should be understood that alternative embodiments need not employ supersonic nozzles. However, the use of supersonic nozzles provides maximum efficiency of operation of the air compressor 42, providing better energy conversion. The cleaning effect of an air pulse is a function of the amount of air pumped into the filter assembly 13. Cleaning can be increased by increasing either the mass of the air entering the filter assembly 13 or the velocity of that air. By increasing the velocity of air flowing through the nozzles 40 to a supersonic speed, the amount of air pumped into the filter assembly 13 can be increased without increasing the quantity or mass of air flowing through the nozzle 40. Therefore, the supersonic nozzle 40 requires less compressed air to fill the filter assembly 13. Increasing the amount of air flowing through the nozzle 40 would require an increase in the size of the air compressor 42 and decrease the efficiency of operation of the dust collector.

One of the air conduits 46 and an associated nozzle 40 are shown in FIG. 3. Generally the nozzles 40 are shaped such that the air flowing from the conduits 46 and through the nozzles 40 toward the opening of the filter assemblies 13 will reach supersonic velocity at the downward or discharge end 54 of the nozzles 40. As is well known to those skilled in the art, by providing a nozzle 40 having a properly contoured converging portion 56 and diverging portion 58 such as that shown in FIG. 3, when the air in the conduit 46 and adjacent the upstream end or converging end 56 of the nozzle 40 is at a sufficiently elevated pressure, the velocity of the air flowing through the downstream end or diverging end 58 of the nozzle 40 can be elevated to a supersonic speed. In the instant case pulses of compressed air are conveyed by the conduits 46 in a controlled manner. Such pulses of compressed air cause airflow through the nozzles 40, and the air pulses being discharged by the nozzles 40 reach supersonic velocity of the discharge end 54 of the nozzles 40.

The air pulse enters the filter assembly 13 and impinges upon the end plate 30. When the air hits the end plate 30, the velocity of the air drops to zero, and velocity pressure converts to static pressure, thereby increasing the pressure inside the filter assembly 13. The pressure inside the filter assembly 13 continues to increase until it is great enough to blow the caked material off the entire surface area of the filter medium 27.

To achieve this cleaning of the filter medium 27, the invention provides means for directing pulses of air toward the opening 20 such that the air pulses propagate downwardly into the filter assembly 13 and impinge directly upon the end plate 30 and do not impinge upon the filter medium 27, and such that the air pulses propagate toward the opening 20 in a cone-shaped pattern (as shown in FIG. 2) with the base of the cone engaging the header plate 15 at the opening 20 and surrounding the opening 20. The means for directing pulses also provides air pulses entering the filter assembly 13 at a controlled velocity.

Referring more particularly to the construction of the means for directing pulses of air toward the opening 20, the nozzle 40 is positioned above or in spaced relation from the opening 20 at a sufficient distance that the base of the cone of the air pulse emitted by the nozzle 40 has a diameter approximating and at least equal to diameter of the opening 20 such that the base of the cone surrounds the opening 20. The purpose of this is to seal the opening 20 so that air entering the filter assembly 13 from the nozzle 40 cannot escape through the opening 20. If air escapes upwardly through the opening 20, the pressure in the filter assembly 13 cannot become great enough to dislodge the cake from the filter medium 27. If the cone of air seals the opening 20, the pressure in the filter assembly 13 builds until the air is forced out through the filter medium 27, thereby dislodging the cake.

To cause the air pulse to impinge directly on the end plate 30 and not on the filter medium 27, the air jet must enter the opening 20 at the proper speed.

The reverse air jet enters the opening 20 propagating straight downward and such that it does not impinge on the filter medium 27. Air also enters the filter assembly 13 through any open areas in the filter medium 27 where contaminants have not become caked, this air being sucked in by the air jet entering the opening 20. This air sucked in through the filter medium 27 has two effects.

First, it causes the air jet to grow in diameter, and if the growth is sufficient, the air jet will impinge upon the filter medium 27. This impingement is undesirable because it results in the air jet dislodging the cake from the filter medium 27 only at the point of impingement. Air then escapes from the filter assembly 13 at that point, and the pressure in the filter assembly 13 never increases enough to blow the caked material off the remainder of the filter medium 27. When the air pulses impinge only on the end plate 30, the cake is undisturbed and the air pressure in the filter assembly 13 increases until the pressure is great enough to blow the caked material off the entire area of the filter medium 27.

Second, the air sucked through the filter medium 27 by the air jet causes the contaminants caught in the filter medium 27 to become more tightly packed into the filter medium 27. If too much air is sucked in through the filter medium 27, this packing makes the caked material virtually impossible to dislodge.

The rate of air entering through open areas in the filter medium 27 and the consequent growth of the air jet and packing of the cake is a function of the speed of the air jet and the amount of open area. With conventional filter assemblies 13 and filter media 27, the amount of open area is fairly constant, so that the rate of air entering through open areas in the filter medium 27 can be controlled by controlling the velocity of the air entering the opening 20. To achieve this, the means for directing air pulses causes air to enter the opening 20 at a controlled velocity.

It has been found that an air jet speed of 150 to 250 feet per second when entering the opening 20 is optimal for preventing the air jet from growing so as to impinge upon the filter medium 27, and for preventing packing of the cake. Therefore, in the embodiment illustrated in FIG. 2, the nozzle 40 is spaced above the wall opening 20 such that the air pulses enter the wall opening 20 at a speed of 150 to 250 feet per second. In alternative embodiments, employing filter assemblies having qualities differing from those of the conventional filter assemblies just mentioned, the air pulses could enter the opening 20 at other speeds.

Various features of the invention are set forth in the following claims.

What is claimed is:

1. In the process of cleaning filter media in a filter apparatus wherein air is passed from an inlet through generally tubular filter media to a clean air exhaust chamber with contaminants in said air being filtered from the air by said filter media and accumulating on said filter media, said filter media having a closed end and being open to said exhaust chamber but closed to said inlet, and wherein the contaminants on said filter media are cleaned from said filter media by periodically directing air through said filter media from the exhaust chamber said thereof, the improvement of controlling the speed of the air as it enters side filter media from the exhaust chamber side thereof such that the air flowing into said filter media does not impinge on said filter media but flows to the closed end of said filter media without said impingement and after impinging on said closed end said air proceeds to occupy the interior of said filter media and produce airflow through said filter media from the exhaust chamber side to remove said contaminants from said filter media.

2. A filter apparatus comprising, in combination,
a hopper,
an exhaust chamber, a wall separating said hopper and said exhaust chamber, said wall including an opening, means for filtering contaminated air flowing through said opening from said hopper, said filtering means including a hollow filter assembly comprising filter medium and having upper and lower ends, said upper end of said filter assembly registering with said wall opening and said hopper being generally sealed from said exhaust chamber except through said wall opening and said filter medium of said filter assembly, and said filtering means further including an end plate generally parallel to said wall at said lower end of said filter assembly.

means defining an inlet into said hopper for introducing contaminated air into said hopper so that said contaminated air is caused to flow to said exhaust chamber through said filter medium and airborne contaminants are accumulated on said filter medium, means for selectively directing reverse pulses of air into said wall opening from said exhaust chamber whereby said reverse air pulses enter said filter assembly and generate an increased air pressure in said filter assembly and airflow through said filter medium in the reverse of the direction of contaminated airflow to remove accumulated contaminants from said filter medium, and said air pulse direction means being spaced above said wall opening and constructed to accelerate the air emitted toward said wall opening such that said air pulses propagate toward said wall opening in a conse-shaped pattern with the base of the cone engaging said wall at said wall opening and surrounding said wall opening, such that said air pulses enter said wall opening at a speed of 150 to 250 feet per second, and such that said air pulses propagate downwardly into said filter assembly and impinge directly upon said end plate and do not impinge upon said filter medium.

3. A filter apparatus as set forth in claim 2 wherein said air filter directing means includes nozzle means which accelerates the air emitted toward said wall opening to supersonic velocity.

4. A filter apparatus as set forth in claim 2 wherein said means for directing a reverse pulse of air includes a conduit in said exhaust chamber and means for supplying air under pressure to said conduit, and a nozzle supported by said conduit for directing air from said conduit toward said opening.

5. A filter apparatus comprising, in combination, a hopper, an exhaust chamber, a wall separating said hopper and said exhaust chamber, said wall including an opening, means for filtering contaminated air flowing through said opening from said hopper, said filtering means including a hollow filter assembly comprising filter medium and having upper and lower ends, said upper end of said filter assembly registering with said wall opening and said hopper being generally sealed from said exhaust chamber except through said wall opening and said filter medium of said filter assembly, and said filtering means further including plate means generally parallel to said wall at said lower end of said filter assembly, means defining an inlet into said hopper for introducing contaminated air into said hopper so that said contaminated air is caused to flow to said exhaust chamber through said filter medium and airborne contaminants are accumulated on said filter medium, means for selectively directing reverse pulses of air into said wall opening from said exhaust chamber at a controlled rate of speed so that said reverse air pulses enter said filter assembly and generate an airflow through said filter medium in the reverse of the direction of contaminated airflow to remove accumulated contaminants from said filter medium, and said air pulse directing means being spaced above said wall opening and constructed to accelerate the air emitted toward said wall opening such that said air pulses propagate toward said wall opening in a cone-shaped pattern and so that, as a result of said speed being controlled, said air pulses enter said wall opening at preselected speed sufficient to cause said air pulses to propagate downwardly into said filter assembly without impinging on the inner walls thereof and said propagating air impinges directly upon said end plate after which said air proceeds to occupy said filter and produce the reversed airflow through said flow medium.

* * * * *

UNITED STATES PATENT AND TRADEMARK OFFICE
CERTIFICATE OF CORRECTION

PATENT NO. : 4,789,387
DATED : December 6, 1988
INVENTOR(S) : Stephen A. Nemesi and William J. Klimczak It is certified that error appears in the above-identified patent and that said Letters Patent is hereby corrected as shown below:

```
Column 6, Claim 1, line 56,
         "side" should be --said--.

Column 7, Claim 2, line 28,
         "direction" should be --directing--.

Column 8, Claim 5, line 45,
         "flow" should be --filter--.
```

Signed and Sealed this

Twenty-eighth Day of August, 1990

*Attest:*

HARRY F. MANBECK, JR.

*Attesting Officer*     *Commissioner of Patents and Trademarks*